(12) United States Patent
Rodriguez et al.

(10) Patent No.: US 8,599,065 B2
(45) Date of Patent: Dec. 3, 2013

(54) SBAS RECEIVER

(75) Inventors: Filippo Rodriguez, Rome (IT); Gian Paolo Plaia, Rome (IT)

(73) Assignee: Telespazio S.p.A., Rome (IT)

( * ) Notice: Subject to any disclaimer, the term of this patent is extended or adjusted under 35 U.S.C. 154(b) by 151 days.

(21) Appl. No.: 12/933,288

(22) PCT Filed: Mar. 20, 2008

(86) PCT No.: PCT/EP2008/053414
§ 371 (c)(1),
(2), (4) Date: Dec. 20, 2010

(87) PCT Pub. No.: WO2009/115128
PCT Pub. Date: Sep. 24, 2009

(65) Prior Publication Data
US 2011/0084877 A1   Apr. 14, 2011

(51) Int. Cl.
*G01S 19/07* (2010.01)
*G01S 19/09* (2010.01)

(52) U.S. Cl.
USPC .................................. 342/357.46; 342/357.44

(58) Field of Classification Search
USPC ............. 342/357.44, 357.46, 357.51, 357.62; 701/468, 469
See application file for complete search history.

(56) References Cited

U.S. PATENT DOCUMENTS

| 2005/0090265 | A1 | 4/2005  | Abraham    | 455/456.1 |
| 2006/0274821 | A1 | 12/2006 | Chen et al.| 375/149   |
| 2007/0216574 | A1 | 9/2007  | Huang      | 342/357.02|
| 2007/0247361 | A1 | 10/2007 | Shoarinejad| 342/357.09|

FOREIGN PATENT DOCUMENTS

WO   WO 2004/017092   2/2004

OTHER PUBLICATIONS

International Search Report and Written Opinion for PCT/EP2008/2053414 filed Mar. 20, 2008; 9 pages.

*Primary Examiner* — Dao Phan
(74) *Attorney, Agent, or Firm* — Westman, Champlin & Koehler, P.A.

(57) ABSTRACT

Disclosed herein is a Satellite Based Augmentation System (SBAS) receiver. The SBAS receiver is configured to receive SBAS messages containing augmentation data and to provide one or more served GPS receivers with augmentation information based on the augmentation data extracted from the received SBAS messages. The SBAS receiver is designed to implement a Finite State Machine (FSM) intended to be common to all served GPS receivers, and configured to evolve based on the received SBAS messages and to store the augmentation data contained therein. The common FSM is further configured to cooperate with a number of correction modules equal to the number of served GPS receivers, each correction module being configured to receive GPS data from a corresponding served GPS receiver, and to compute an augmented position for the corresponding served GPS receiver based on the corresponding GPS data and on augmentation data retrieved from the common FSM. If the correction modules are implemented in the SBAS receiver, then the augmentation information provided by the SBAS receiver to each served GPS receiver is the augmented position computed by the corresponding correction module. If the correction modules are each implemented in a corresponding served GPS receiver, then the augmentation information provided by the SBAS receiver to the served GPS receiver is the augmentation data stored in the common FSM.

13 Claims, 5 Drawing Sheets

SBAS RECEIVER

CROSS-REFERENCE TO RELATED APPLICATION

This Application is a Section 371 National Stage Application of International Application No. PCT/EP2008/053414, filed Mar. 20, 2008 and published as WO/2009/115128 on Sep. 24, 2009, in English, the contents of which are hereby incorporated by reference in their entirety.

TECHNICAL FIELD OF THE INVENTION

The present invention relates in general to an improved Satellite Based Augmentation System (SBAS) receiver and, more particularly, to an improved European Geostationary Navigation Overlay Service (EGNOS) receiver.

BACKGROUND ART

As is known, Global Positioning System (GPS) is a worldwide radio-navigation system formed by a constellation of satellites and corresponding ground stations. Each satellite continually broadcasts its location in space along with the transmission time from an internal clock. GPS receivers are able to determine their position by receiving and analyzing signals transmitted from the GPS satellites.

In particular, for each signal from a GPS satellite, a GPS receiver computes the difference between the transmission time and the time at which the signal has been received and then, assuming GPS signal propagation speed to be known, computes its distance from the GPS satellite based on this difference. This distance is called pseudorange. A GPS receiver determines its location by performing a geometric triangulation on pseudoranges relating to several GPS satellites. Two-dimensional locations are able to be determined by exploiting pseudoranges relating to three GPS satellites, and three-dimensional locations are able to be determined by exploiting pseudoranges relating to four or more GPS satellites.

Although the current GPS has been successful, it has several shortcomings that affect the accuracy of positioning calculations. In fact, GPS satellite signals are subject to errors caused by ionospheric and tropospheric disturbances, satellite clock drifts and satellite orbit discrepancies. For example, ionospheric and tropospheric refraction can slow satellite signals and cause carrier signals and codes to diverge. Because ionospheric disturbances vary greatly from location to location, these errors are difficult to correct with civilian-type GPS receivers.

These shortcomings make GPS in itself not useable for safety critical services, such as air navigation. In fact, for instance, GPS signal is affected by too much error and uncertainty to meet mandatory air aviation precision requirements.

For this reason, recently, different GPS augmentation techniques have been developed, i.e. techniques oriented to improve accuracy, reliability, availability, and integrity of GPS through the integration of external information into the calculation process.

Figure 1:
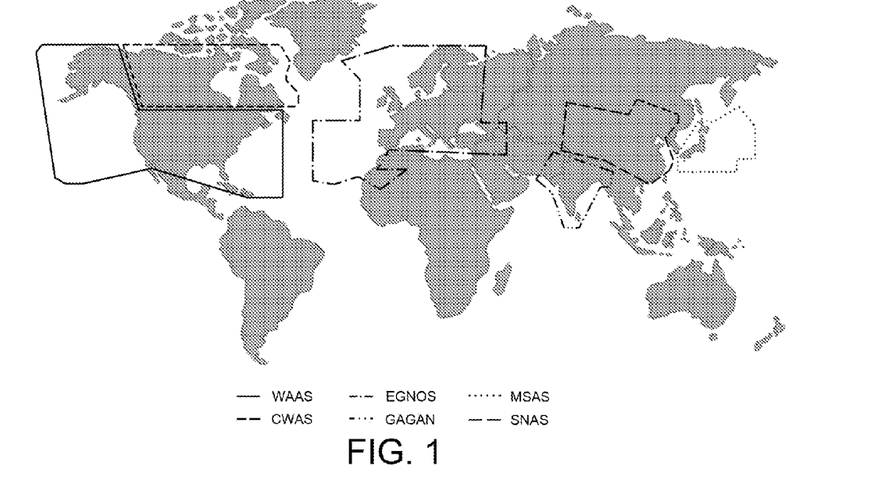
FIG. 1 shows schematically locations of several Satellite Based Augmentation Systems (SBAS) under development in the world.

In particular, a Satellite Based Augmentation System (SBAS) is a system that supports wide-area or regional augmentation through the use of additional satellite-broadcast messages. Examples of SBASs are the Wide Area Augmentation System (WAAS) developed in the U.S.A. by the Federal Aviation Administration (FAA), the European Geostationary Navigation Overlay Service (EGNOS) developed in Europe by the European Space Agency (ESA), the European Commission and EUROCONTROL, and the Japanese Multi-functional Satellite Augmentation System (MSAS). FIG. 1 shows schematically locations of several SBASs under development in the world.

Radio Technical Commission for Aeronautics (RTCA) document number DO-229D, called *Minimum Operational Performance Standards (MOPS) for Global Positioning System/Wide Area Augmentation System Airborne Equipment*, and prepared by RTCA Special Committee 159, contains Minimum Operational Performance Standards (MOPS) for airborne navigation equipment (2D and 3D) using the GPS augmented by the WAAS and represents international SBAS standard to be applied by all government agencies. In this way all SBAS service providers will ensure signal compatibility and system interoperability thus contributing to a true worldwide seamless navigation service.

Specifically, a receiver compliant with RTCA/DO-229D MOPS will work with any SBAS, i.e. WAAS, EGNOS, MSAS etc.

In detail, SBASs improve the performances of GPS with the objective to make it useable for safety critical services, such as air navigation. This is accomplished by providing, by means of separate signals, a set of corrections that improve the accuracy of the position calculation performed by the user satellite receiver. In particular, EGNOS provides these corrections not only for GPS but also for the Global Orbiting Navigation Satellite System (GLONASS).

Generally speaking, an SBAS is based on the principle of the spatial and temporal correlation of measurement errors that arise when making distance measurement from a space born source. The difference between the theoretical and the real measurement performed in a known position can be found, with similar values, in other real measurements performed in the nearby of the known position. In other words this principle says that the distance measurements made in a small geographical area may be affected by the same errors. So, once you know the measurement error in one place, it can be used as a correction for the distance measurements made in nearby places. In a scenario where several reference points are available, a wide area correlation law, which models the difference in distance measurements, can be derived. These data collected by a network of reference stations are processed and then transmitted to the users, by means of geostationary satellites, on a signal having the same frequency as GPS (L1=1575.42 MHz) and a different data format. SBAS messages contain information for the computation of pseudoranges corrections, but also integrity parameters, used to estimate the degree of confidence of the position computation.

The information contained in the navigation message modulated on L1, the additional ranging capability offered by the geostationary satellites and the complexity of ground processing and checks, are able to improve the accuracy, the integrity and the reliability of GPS.

As said above and as all SBASs, EGNOS has been designed to meet the demanding air navigation performance requirements, in particular thought for landing aircrafts:
  accuracy will be improved to about 2-4 meters vertically and 1-3 meters horizontally through the broadcast of Wide-Area Differential (WAD) corrections;
  integrity (safety) will be improved both through the high degree of redundancy in the system and by alerting users within 6 seconds if some system degradation occurs to EGNOS, GPS or GLONASS;
  continuity will be improved in order to keep the system working during the next 150 seconds from the beginning of any intended operation; and availability will be improved by broadcasting GPS look-alike signals from geostationary satellites.

EGNOS measurements already confirm that accuracy will be in the order of 2-4 meters vertically and 1-3 meters horizontally inside the European Civil Aviation Conference (ECAC) area.

More in detail, EGNOS provides a European-wide, standardized and quality-assured positioning system suitable for a diverse range of applications. It is highly compatible with GPS, so a single antenna and receiver may process both the GPS and EGNOS signals eliminating the need for a separate radio to receive corrections.

Figure 2:
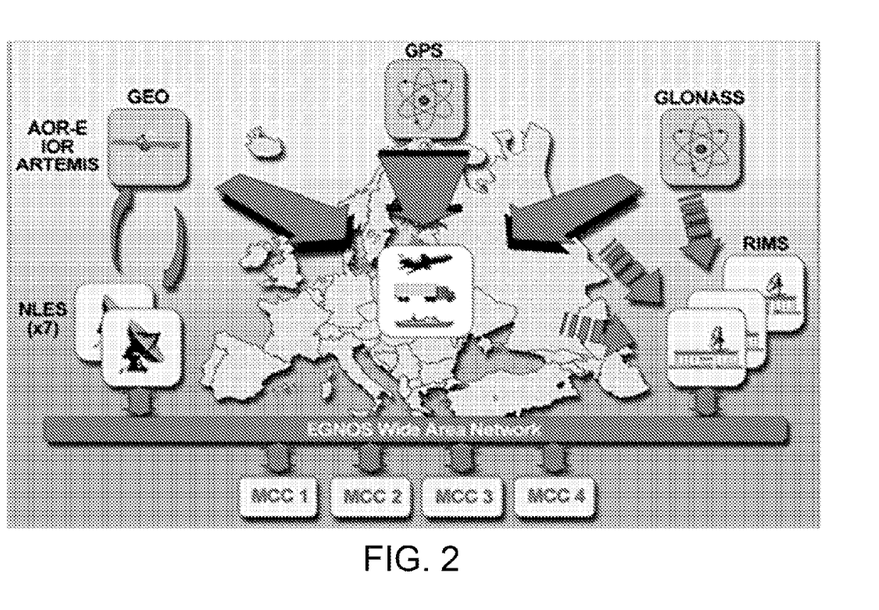
FIG. 2 shows schematically European Geostationary Navigation Overlay Service (EGNOS) architecture.

FIG. 2 shows schematically EGNOS architecture. In particular, thirty-four Reference and Integrity Monitoring Stations (RIMS) are deployed to monitor the satellite constellation satellites. Each satellite has to be monitored by multiple RIMS before correction and integrity messages are generated. Four Mission Control Centres (MCC) process data from these RIMS to generate the corrections and integrity messages for each satellite. In particular, MMCs generate a single set of integrity data and GPS corrections for Europe comprising terms to correct for each satellite clock and ephemeris errors as well as errors due to the ionosphere.

Only one of these MCCs is active and operational, the other MCCs are hot spares that can be activated if a problem occurs.

Navigation Land Earth Stations (NLES) upload the corrections and integrity messages to the satellites, for onward broadcast to the users. The system will deploy two NLESs (one primary and one backup) for each of the three geostationary satellites, and a further NLES for test and validation purposes.

The EGNOS space segment is composed of three geostationary satellites with global earth coverage. The EGNOS operational system is based on the use of two INMARSAT-3 satellites (AOR-E and IOR), as well as the ESA ARTEMIS satellite.

The integrity data and corrections are modulated on a GPS look-alike signal and broadcasted to users from the three geostationary satellites. The resulting performance (close to 1 m across Europe) is independent of user/reference station distance. EGNOS users will benefit from enhanced availability due to the three additional ranges.

Moreover, EGNOS users should be able to track at least two geostationary satellites. It takes less than six seconds to notify users about a problem with one of the satellite constellations once it has been monitored by the RIMS network.

EGNOS provides different levels of service at different parts of the area covered by the geostationary satellites. Optimum performance is obtained within the core coverage area, as shown in FIG. 2. There is degraded performance outside the core area, although there is some potential for improvement through interoperability with the Japanese, American and Canadian systems.

As previously said, EGNOS uses the same frequency (L1) and ranging codes as GPS, but has a different data message format. The messages come once per second and are made up of 250 bits, among which 212 represent augmentation data, eight are used for acquisition and synchronization, six to identify the message type and the remaining twenty four are parity bits to protect against the use of corrupted data.

Sixty-four different message types have so far been defined to broadcast integrity data and corrections and some of them are showed in the following table:

| Type | Comment | Type | Comment |
| --- | --- | --- | --- |
| 0 | Don't use this SBAS signal for safety applications | 17 | GEO satellite almanacs |
| 1 | PRN Mask assignments | 18 | Ionospheric grid point masks |
| 2-5 | Fast corrections | 24 | Mixed fast/slow error corrections |
| 6 | Integrity information | 25 | Slow satellite error corrections |
| 7 | Fast correction degradation factor | 26 | Ionospheric delay corrections |
| 9 | GEO navigation message | 27 | SBAS service message |
| 10 | Degradation parameters | 63 | Null message |
| 12 | SBAS network Time/UTC offsets | | |

The message schedule follows a 6-second duty cycle. This is structured both to prioritize the 6-second integrity time-to-alarm and to minimize the time for EGNOS initialization. However, although EGNOS message schedule has been thought to minimize initialization period, EGNOS receivers still need to be initialized during a non-operative initialization period before being active, i.e. before providing corrections.

Figure 3:
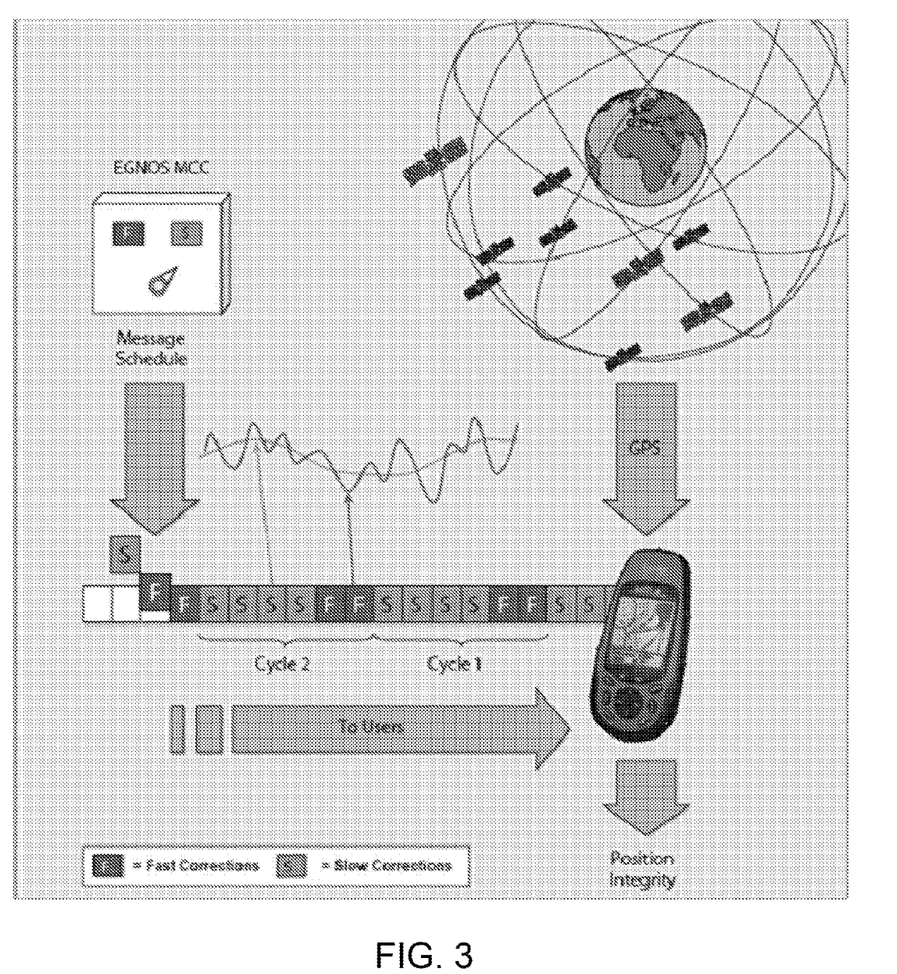
FIG. 3 shows schematically EGNOS message providing and scheduling architecture.

FIG. 3 shows schematically EGNOS message providing and scheduling architecture.

Fast and slow corrections model the temporal decorrelation of the different error sources. The fast corrections model rapidly changing error sources including satellite clock errors. The slow corrections model more slowly changing error sources including long-term satellite clock drift, satellite ephemeris errors and ionospheric delays, the latter provided at pre-defined grid points.

Message processing is complex both because the messages have been designed to minimize the bandwidth requirements and because they need to account for updated GPS navigation information.

Hereinafter two examples of SBAS message processing are given: the former relating to a fast correction message and the latter relating to a slow correction message.

In particular, SBAS message type 2, as shown in the previous table, contains fast corrections. At the arrival of a SBAS message of this type, the EGNOS receiver performs the following operations:

the SBAS message is decoded and pseudorange correction PRC, range rate correction RRC, and applicability time $T_0$ are extracted;

difference $T_R$-$T_0$ is computed, where $T_R$ is the instant at which the EGNOS message 2 has been received and for fast corrections always results that $T_0 < T_R$;

actual pseudorange correction $PRC_A$ is computed as follows:

$$PRC_A = PRC + RRC \times (T_R - T_0)$$

the actual pseudorange correction $PRC_A$ is added to the GPS-based computed pseudorange to remove fast satellite clock error and to obtain a corrected pseudorange; and augmented position is computed based on the corrected pseudorange.

Contrary to SBAS message type 2, SBAS message type 25 contains slow corrections. At the arrival of a SBAS message of this type, the EGNOS receiver performs the following operations:

the SBAS message is decoded and considered valid while data extracted from the previous message 25 are still kept in memory; and velocity code v, satellite location correction terms $\Delta x$, $\Delta y$, $\Delta z$, and time correction terms are extracted.

At this point, the EGNOS receiver may perform two alternative sets of operations depending on value assumed by the velocity code v.

If v=0, the previous message 25 is substituted by the actual one; GPS-received satellite location $(x_{sat}^{GPS}, y_{sat}^{GPS}, z_{sat}^{GPS})$ is corrected as follows:

$$\begin{cases} x_{sat}^{corr} = x_{sat}^{GPS} + \Delta x \\ y_{sat}^{corr} = y_{sat}^{GPS} + \Delta y \\ z_{sat}^{corr} = z_{sat}^{GPS} + \Delta z \end{cases}$$

and augmented position is computed based on the corrected satellite location $(x_{sat}^{corr}, y_{sat}^{corr}, z_{sat}^{corr})$.

If v=1, satellite velocity correction terms $\Delta v_x$, $\Delta v_y$, $\Delta v_z$ and applicability time $T_0$ are also extracted;

if $T_R < T_0$, where $T_R$ is the instant at which the EGNOS message 25 has been received, and the previous message 25 is still valid, corrections of the previous message 25 are applied;

if $T_R < T_0$ and the previous message 25 is no longer valid, difference $T_R - T_0$ is computed based on the actual message 25;

if $T_R > T_0$ difference $T_R - T_0$ is computed;

final satellite location correction terms are computed as follows:

$$\begin{cases} \Delta x_F = \Delta x + \Delta v_x \times (T_R - T_0) \\ \Delta y_F = \Delta y + \Delta v_y \times (T_R - T_0) \\ \Delta z_F = \Delta z + \Delta v_z \times (T_R - T_0) \end{cases}$$

GPS-received satellite location $(x_{sat}^{GPS}, y_{sat}^{GPS}, z_{sat}^{GPS})$ is corrected as follows:

$$\begin{cases} x_{sat}^{corr} = x_{sat}^{GPS} + \Delta x_F \\ y_{sat}^{corr} = y_{sat}^{GPS} + \Delta y_F \\ z_{sat}^{corr} = z_{sat}^{GPS} + \Delta z_F \end{cases}$$

and augmented position is computed based on the corrected satellite location $(x_{sat}^{corr}, y_{sat}^{corr}, z_{sat}^{corr})$.

OBJECT AND SUMMARY OF THE INVENTION

The Applicant has carried out an in-depth study in order to develop a software-implemented EGNOS receiver able to work at the same time for several GPS receivers. During this study, the Applicant has noted that the use of a classic EGNOS correction computing approach implies the necessity of providing a number of full EGNOS receiver instances that is equal to the number of served GPS receivers.

In fact, according to classic EGNOS correction computing approach, the EGNOS receiver receives and decodes a SBAS message, extracts augmentation data, such as pseudorange correction PRC, range rate correction RRC, applicability time $T_0$, velocity code v, satellite location correction terms $\Delta x$, $\Delta y$, $\Delta z$, etc., computes corrections, such as the actual pseudorange correction $PRC_A$, applies corrections to the GPS-based measurements, such as the GPS-based computed pseudorange, and to the GPS-received data, such as the GPS-received satellite location $(x_{sat}^{GPS}, y_{sat}^{GPS}, z_{sat}^{GPS})$, and computes augmented position contextually.

Therefore, it follows that, according to classic EGNOS correction computing approach, an EGNOS receiver needs to be completely dedicated to serving a GPS receiver.

Figure 4:
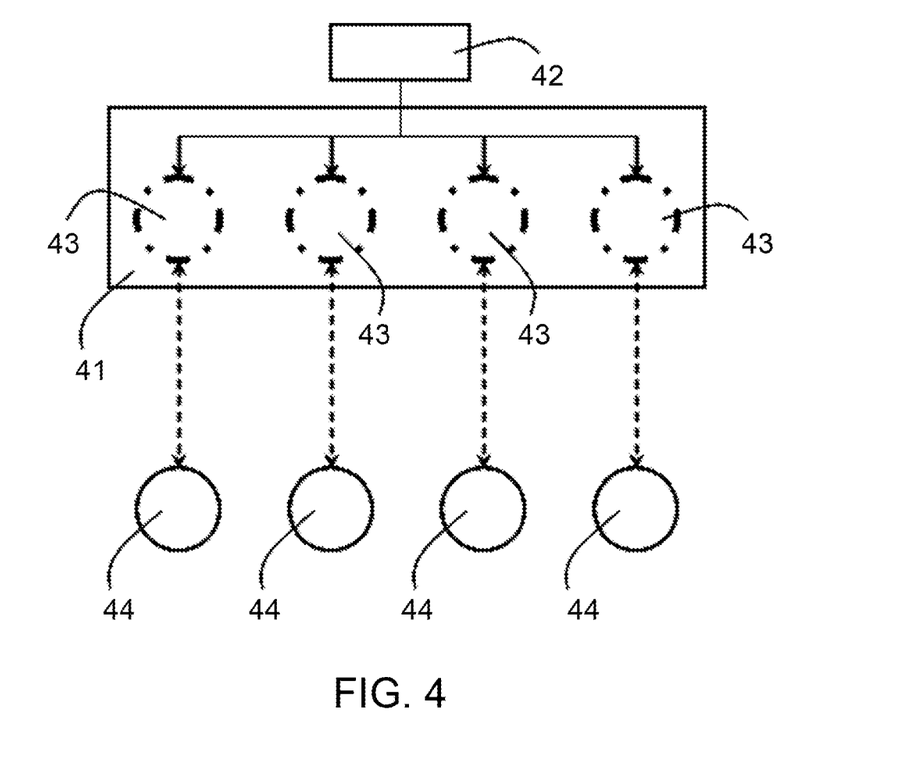
FIG. 4 shows schematically an EGNOS receiver which serves several GPS receivers according to a classic EGNOS correction computing approach.

In particular, FIG. 4 shows schematically this scenario wherein an electronic processor 41, coupled with SBAS messages receiving means 42 and configured to receive as input SBAS messages therefrom, serves four GPS receivers 44. As shown in FIG. 4, the electronic processor 41 provides four full EGNOS receiver instances 43, each coupled with and completely dedicated to a respective served GPS receiver.

This scenario implies a considerable consumption of resources, in terms of processing resources and allocated memory, because of computationally-intensive processing.

Moreover, once an EGNOS receiver instance 43 has been created, it needs to be kept instantiated and to continue to process SBAS messages even if the respective GPS receiver 44 is not asking for EGNOS-based augmented position, thus leading to a waste of resources. In fact, otherwise, if the EGNOS receiver instance 43 is de-allocated, when the GPS receiver 44 starts again to ask for EGNOS-based augmented position, it would be necessary to instantiate a new EGNOS receiver instance 43 and to wait the non-operative initialization period before obtaining a valid EGNOS-based augmented position.

Furthermore, for the future several scenarios of SBAS message provision are hypothesized, such as via a packet-based network, which would be hardly interfaceable with any single EGNOS receiver instance.

The objective of present invention is then to provide an EGNOS, or more in general an SBAS receiver which can alleviate at least in part the above cited drawbacks.

This objective is achieved by the present invention in that it relates to a SBAS receiver and a software program product configured to implement the SBAS receiver, as defined in the appended claims.

Therefore, a Satellite Based Augmentation System (SBAS) receiver according to the present invention is configured to receive SBAS messages containing augmentation data and to provide one or more served GPS receivers with augmentation information based on the augmentation data extracted from the received SBAS messages. The SBAS receiver is designed to implement a Finite State Machine (FSM) intended to be common to all served GPS receivers, and configured to evolve based on the received SBAS messages and to store the augmentation data contained therein. The common FSM is further configured to cooperate with a number of correction modules equal to the number of served GPS receivers, each correction module being configured to receive GPS data from a corresponding served GPS receiver, and to compute an augmented position for the corresponding served GPS receiver based on the corresponding GPS data and on augmentation data retrieved from the common FSM.

Conveniently, the correction modules may be implemented in the SBAS receiver, and the augmentation information provided by the SBAS receiver to each served GPS receiver may be the augmented position computed by the corresponding correction module.

Otherwise, the correction modules may be each conveniently implemented in a corresponding served GPS receiver, and the augmentation information provided by the SBAS receiver to the served GPS receiver may be the augmentation data stored in the common FSM.

Moreover, the SBAS receiver may be conveniently software-implemented.

BRIEF DESCRIPTION OF THE DRAWINGS

For a better understanding of the present invention, preferred embodiments, which are intended purely by way of example and are not to be construed as limiting, will now be described with reference to the attached drawings (all not to scale), wherein.

DETAILED DESCRIPTION OF PREMIUM EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

Moreover, the present invention is implemented by means of a software program product, loadable in a memory of an electronic processor, and comprising software code portions for implementing, when the software program product is run on the electronic processor, the SBAS receiver described hereinafter.

According to the present invention, SBAS correction computing process is split into two sub-processes, i.e. SBAS message reception and decoding, and augmentation data extraction are uncoupled from correction computing and applying, and augmented position computing.

This is done by performing asynchronously the two sub-processes, i.e. by keeping correction time $T_C$ distinct from SBAS message reception time $T_R$.

Figure 5:
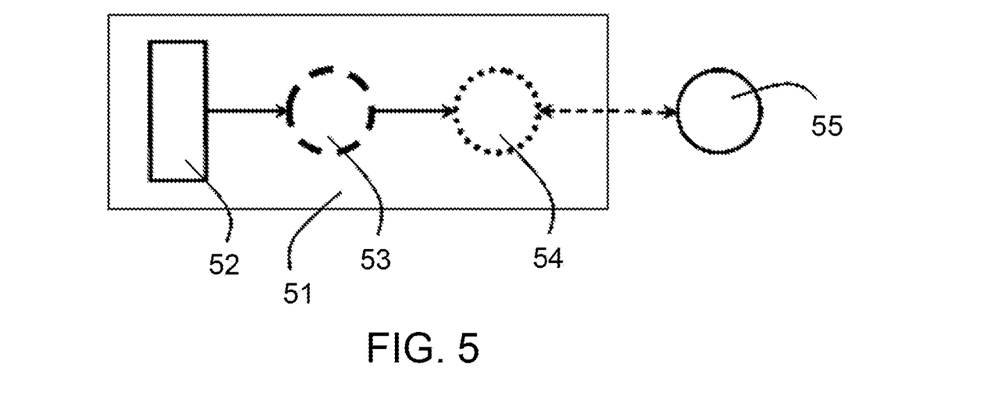
FIG. 5 shows schematically an SBAS receiver according to the present invention.

FIG. 5 shows schematically an SBAS receiver 51 according to the present invention.

In detail, the SBAS receiver 51 comprises SBAS messages receiving means 52, a common Finite State Machine (FSM) 53, and a correction module 54. Moreover, the SBAS receiver 51 is coupled with a GPS receiver 55.

More in detail, the SBAS message receiving means 52 may be a dedicated SBAS antenna, or a packet-based network interface, such as a GPRS or UMTS or WiFi or WiMAX or Internet or dedicated TCP/IP-based network interface.

The common FSM 53 is configured to receive as input SBAS messages from the SBAS message receiver means 52 and decodes the received SBAS messages extracting the augmentation data independently of, and asynchronously with respect to correction computing and applying, and augmented position computing.

The common FSM 53 stems from the observation made by the Applicant that SBAS message reception and decoding, and augmentation data extraction processing, if uncoupled from correction computing and applying, and augmented position computing, as according to the present invention, may be modelized as a Finite State Machine (FSM). Each state of the common FSM 53 provides information about availability or unavailability of the augmentation data and each change of state implies applicability of different integrity levels (Non Precision Approach, Precision Approach APV I and II). In turn, the common FSM 53 comprises a respective dedicated FSM for each SBAS message type. The state of each dedicated FSM provides information about availability or unavailability of the augmentation data specific to the respective SBAS message to which it's dedicated. Moreover, the state of each dedicated FSM is associated with respective state variables which comprise the augmentation data to be used to compute the respective specific corrections.

Furthermore, the state of the common FSM 53 is represented by a set of the states of all the dedicated FSMs and is associated with state variables comprising the state variables of all the dedicated FSMs.

In particular, every second, at the arrival of a new SBAS message, the respective dedicated FSM decodes the SBAS message extracting augmentation data. The resulting state of the dedicated FSM represents the availability of the specific augmentation data and is associated with the respective state variables which comprise the just extracted augmentation data.

Hereinafter two examples of SBAS message processing made by the respective dedicated FSMs are given: the former relating to a fast correction message and the latter relating to a slow correction message.

Figure 6:
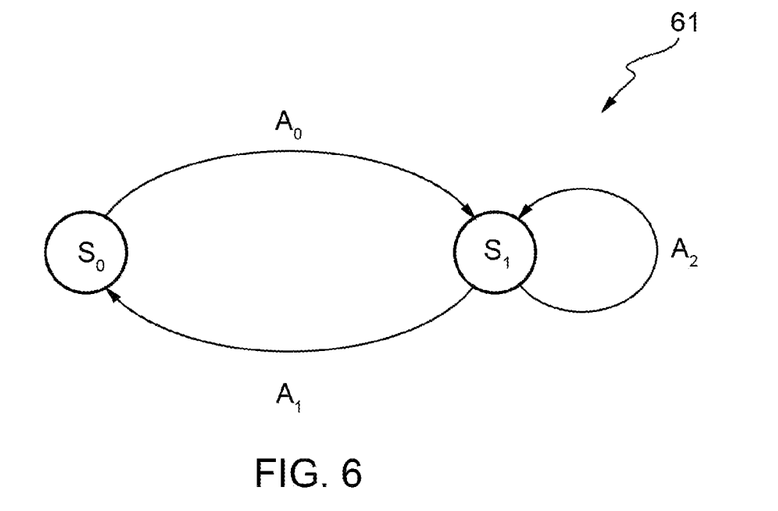
FIG. 6 shows a schematic directed graph representation illustrating an example of a dedicated Finite State Machine (FSM) specific for fast correction message processing according to the present invention.

FIG. 6 shows a schematic directed graph representation illustrating an example of a dedicated FSM 61 specific for fast correction message processing, in particular specific for SBAS message 2 processing. The directed graph representation consists of vertices $S_0$ and $S_1$, and directed arcs $A_0$, $A_1$ and $A_2$. The states of the dedicated FSM 61 are represented by the vertices $S_0$ and $S_1$, and the state transitions are represented by the arcs $A_0$, $A_1$ and $A_2$. The vertex $S_0$ represents a "no available augmentation state", while the vertex $S_1$ represents an "available augmentation state".

In detail, if at an instant $T_R$ a SBAS message 2 is received, the respective dedicated FSM 61 decodes the SBAS message and extracts the augmentation data, i.e. pseudorange correction PRC, range rate correction RRC, and applicability time $T_0$.

Moreover, if the dedicated FSM 61 has already been in the "available augmentation state" $S_1$, it remains in the "available augmentation state" $S_1$, as indicated by the arc $A_2$, and replaces in the associated $S_1$ state variables the old augmentation data with the just extracted ones. A validity time-out is associated with the new $S_1$ state variables.

Otherwise, if the dedicated FSM 61 has been in the "no available augmentation state" $S_0$, the state transition $A_0$ occurs and the dedicated FSM 61 passes from $S_0$ to $S_1$, and the just extracted augmentation data become the $S_1$ state variables. Again, a validity time-out is associated with the $S_1$ state variables.

The state transition $A_1$ occurs when the validity time-out associated with the $S_1$ state variables expires without any new SBAS message 2 arriving.

Figure 7:
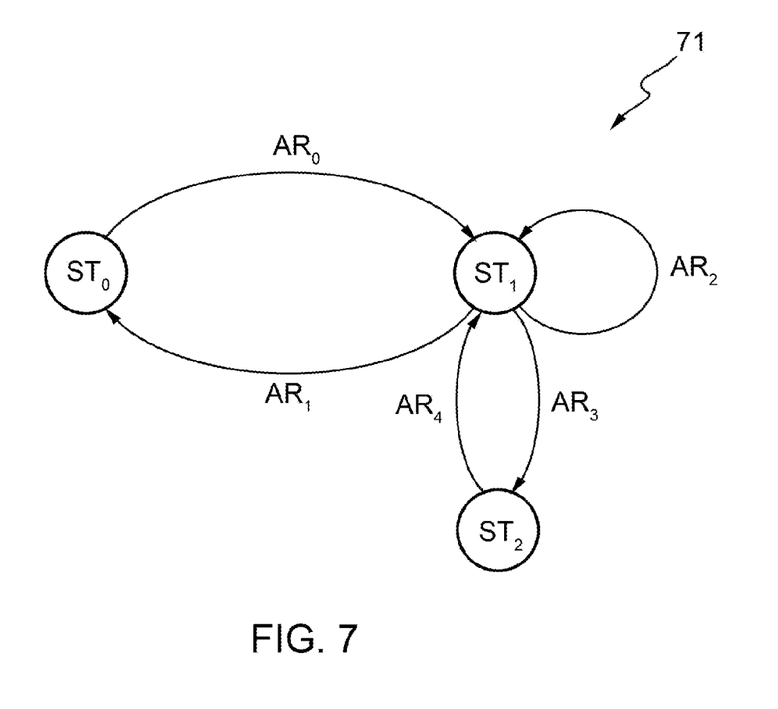
FIG. 7 shows a schematic directed graph representation illustrating an example of a dedicated FSM specific for slow correction message processing according to the present invention.

FIG. 7 shows a schematic directed graph representation illustrating an example of a dedicated FSM 71 specific for slow correction message processing, in particular specific for SBAS message 25 processing. The directed graph representation consists of vertices $ST_0$, $ST_1$, and $ST_2$, and directed arcs $AR_0$, $AR_1$, $AR_2$, $AR_3$, and $AR_4$. The states of the FSM 71 are represented by the vertices $ST_0$, $ST_1$, and $ST_2$, and the state transitions are represented by the arcs $AR_0$, $AR_1$, $AR_2$, $AR_3$, and $AR_4$. The vertex $ST_0$ represents a "no available augmentation state", the vertex $ST_1$ represents a "single available augmentation state", and the vertex $ST_2$ represents a "double available augmentation state".

In detail, at an instant $T_R$ a SBAS message 25 is received.

If the dedicated FSM 71 has been in the "no available augmentation state" $ST_0$, the SBAS message is decoded and considered valid while augmentation data are extracted, i.e. velocity code v, satellite location correction terms $\Delta x$, $\Delta y$, $\Delta z$, and time correction terms.

Moreover, if the velocity code v is equal to 1, satellite velocity correction terms $\Delta v_x$, $\Delta v_y$, $\Delta v_z$, and applicability time $T_0$ are also extracted. Contextually, the state transition $AR_0$ occurs and the dedicated FSM 71 passes from $ST_0$ to $ST_1$, and the just extracted augmentation data become the $ST_1$ state variables. A validity time-out is associated with the $ST_1$ state variables.

If the dedicated FSM 71 has already been in the "single available augmentation state" $ST_1$, the SBAS message is decoded and considered valid while the $ST_1$ state variables containing the augmentation data extracted from the previous SBAS message 25 are still kept in memory. Contextually, the augmentation data are extracted, i.e. velocity code v, satellite location correction terms $\Delta x$, $\Delta y$, $\Delta z$, and time correction terms. Then, if the velocity code v is equal to 0, the dedicated FSM 71 remains in the "single available augmentation state" $ST_1$, as indicated by the arc $AR_2$, and replaces in the associated $ST_1$ state variables the augmentation data extracted from the previous SBAS message 25 with the just extracted ones. Moreover, a validity time-out is associated with the new $ST_1$ state variables. Otherwise, if the velocity code v is equal to 1, satellite velocity correction terms $\Delta v_x$, $\Delta v_y$, $\Delta v_z$ and applicability time $T_0$ are also extracted. Contextually, the state transition $AR_3$ occurs and the dedicated FSM 71 Passes from $ST_1$ to $ST_2$, and the just extracted augmentation data along with the augmentation data extracted from the previous SBAS message 25 become the $ST_2$ state variables. The augmentation data extracted from the previous SBAS message 25 are still associated with the validity time-out with which they were associated as $ST_1$ state variables, while the just extracted augmentation data are associated with a respective validity time-out.

When the validity time-out associated with augmentation data extracted from the previous SBAS message 25 expires, if it happens before the applicability time $T_0$ extracted from the last received SBAS message 25, or else after the applicability time $T_0$ extracted from the last received SBAS message 25, the dedicated FSM 71 passes from $ST_2$ to $ST_1$, as represented by the state transition $AR_4$. In this case, the augmentation data of the last received SBAS message 25 become the $ST_1$ state variables and continue to be associated with the respective validity time-out.

Finally, the state transition $AR_1$ occurs when the validity time-out associated with the $ST_1$ state variables expires without any new valid SBAS message 25 arriving.

The common FSM 53 stores its state along with the associated state variables in storing means, such as a memory, if hardware-implemented storing means, or a data structure, if software-implemented storing means.

The correction module 54 is configured to retrieve the state and the associated state variables of the common FSM 53 from the storing means. Moreover, the correction module 54 is coupled with the GPS receiver 55 and configured to receive as input GPS data, such as GPS-based computed pseudorange and GPS-received satellite location, therefrom.

Therefore, the correction module 54, asynchronously with respect to the common FSM 53, computes corrections based on the state of the common FSM 53 and on the associated state variables, applies the computed corrections, and computes the augmented position.

Hereinafter three examples of processing made by the correction module 54 are given. For the sake of simplifying the description, in the first example the state of the common FSM 53 is represented only by the "available augmentation state" of the dedicated FSM 61, in the second one the state of the common FSM 53 is represented only by the "single available augmentation state" of the dedicated FSM 71, and in the third one the state of the common FSM 53 is represented only by the "double available augmentation state" of the dedicated FSM 71.

In particular, at an instant $T_C$ the GPS receiver 55 asks the correction module 54 for a augmented position and sends GPS data to the correction module 54.

So, in a first case, the correction module 54 retrieves from the storing means the state of the common FSM 53, represented only by the "available augmentation state" of the dedicated FSM 61, and the associated state variables, i.e. pseudorange correction PRC, range rate correction RRC, and applicability time $T_0$. Then, the correction module 54 performs the following operations:

computes difference $T_C$-$T_0$;

computes actual pseudorange correction $PRC_A$ as follows:

$$PRC_A = PRC + PRC \times (T_c - T_0)$$

adds the actual pseudorange correction $PRC_A$ to the GPS-based computed pseudorange to remove fast satellite clock error and to obtain a corrected pseudorange; and computes the augmented position based on the corrected pseudorange.

Differently, in a second case, the correction module 54 retrieves from the storing means the state of the common FSM 53, represented only by the "single available augmentation state" of the dedicated FSM 71, and the associated state variables, i.e. velocity code v, satellite location correction terms $\Delta x$, $\Delta y$, $\Delta z$, time correction terms, and, if v=1, also satellite velocity correction terms $\Delta v_x$, $\Delta v_y$, $\Delta v_z$, and applicability time $T_0$.

At this point, the correction module 54 may perform two alternative sets of operations depending on value assumed by the velocity code v.

If v=0, the correction module 54 performs the following operations:

corrects GPS-received satellite location $(x_{sat}^{GPS}, y_{sat}^{GPS}, z_{sat}^{GPS})$ as follows:

$$\begin{cases} x_{sat}^{corr} = x_{sat}^{GPS} + \Delta x \\ y_{sat}^{corr} = y_{sat}^{GPS} + \Delta y \\ z_{sat}^{corr} = z_{sat}^{GPS} + \Delta z \end{cases}$$

and
- computes the augmented position based on the corrected satellite location $(x_{sat}^{corr}, y_{sat}^{corr}, z_{sat}^{corr})$.

If v=1, the correction module 54 performs the following operations:
- computes difference $T_C - T_0$;
- computes final satellite location correction terms as follows:

$$\begin{cases} \Delta x_F = \Delta x + \Delta v_x \times (T_C - T_0) \\ \Delta y_F = \Delta y + \Delta v_y \times (T_C - T_0) \\ \Delta z_F = \Delta z + \Delta v_z \times (T_C - T_0) \end{cases}$$

- corrects GPS-received satellite location $(x_{sat}^{GPS}, y_{sat}^{GPS}, z_{sat}^{GPS})$ as follows:

$$\begin{cases} x_{sat}^{corr} = x_{sat}^{GPS} + \Delta x_F \\ y_{sat}^{corr} = y_{sat}^{GPS} + \Delta y_F \\ z_{sat}^{corr} = z_{sat}^{GPS} + \Delta z_F \end{cases}$$

and
- computes the augmented position based on the corrected satellite location $(x_{sat}^{corr}, y_{sat}^{corr}, z_{sat}^{corr})$.

In a third case, the correction module 54 retrieves from the storing means the state of the common FSM 53 represented only by the "double available augmentation state" of the dedicated FSM 71, and the associated state variables, i.e. old augmentation data (old velocity code v, old satellite location correction terms $\Delta x$, $\Delta y$, $\Delta z$, old time correction terms, and, if old velocity code v=1, also old satellite velocity correction terms $\Delta v_x$, $\Delta v_y$, $\Delta v_z$ and old applicability time $T_0$ and new augmentation data (new velocity code v, new satellite location correction terms $\Delta x$, $\Delta y$, $\Delta z$, new time correction terms, new satellite velocity correction terms $\Delta_x$, $\Delta v_y$, $\Delta v_z$ and new applicability time $T_0$.

The correction module 54 uses the old augmentation data in order to compute and apply the corrections and to compute the augmented position.

Figure 8:
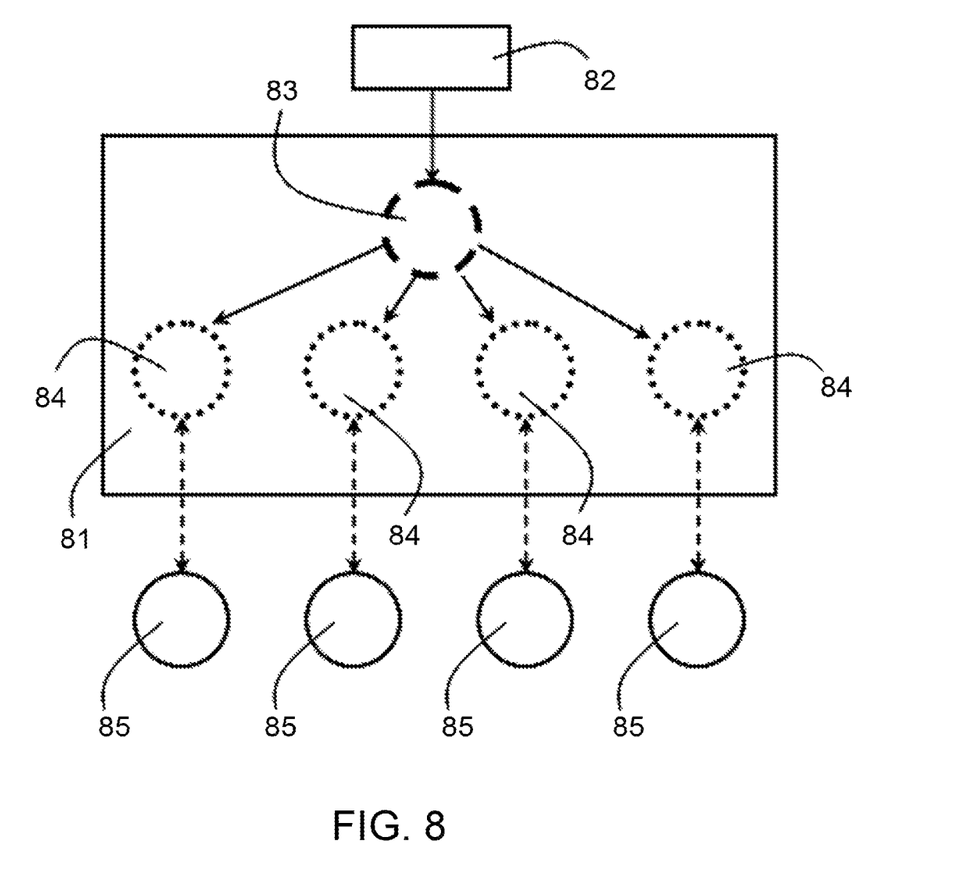
FIG. 8 shows schematically an SBAS receiver which serves several GPS receivers according to the present invention.

FIG. 8 shows an electronic processor 81 configured to provide several GPS receivers 85 with respective SBAS-based augmented positions according to the present invention. In particular, the electronic processor 81 is coupled with SBAS messages receiving means 82 and configured to receive as input SBAS messages therefrom, and provides a single software-implemented instance 83 of the common FSM 53 according to the present invention and a number of software-implemented instances 84 of the correction module 54 according to the present invention, each of them being dedicated to a respective GPS receiver 85 to be provided with the SBAS-based augmented position.

In particular, the SBAS message receiver means 82 may be a dedicated SBAS antenna, or a packet-based network interface, such as a GPRS or UMTS or WiFi or WiMAX or Internet or dedicated TCP/IP-based network interface.

Moreover, the single software-implemented instance always processes SBAS messages, while, once a GPS receiver 85 starts to ask for the SBAS-based augmented position, a respective software-implemented instance 84 is instantiated by the electronic processor 81, the respective software-implemented instance 84 being completely dedicated to providing the GPS receiver 85 with the SBAS-based augmented position. When the GPS receiver 85 stops asking for the SBAS-based augmented position, the respective software-implemented instance 84 is de-allocated by the electronic processor 81.

From the foregoing, it may be immediately appreciated that, in the case of the electronic processor 81 providing several GPS receivers 85 with the respective SBAS-based augmented position, the present invention permits a considerable resource saving, in terms of processing resources and allocated memory, with respect to classic SBAS correction computing approach.

Furthermore, always in the case of the electronic processor 81 providing several GPS receivers 85 with the respective SBAS-based augmented position, future scenarios of SBAS message provision, such as via a packet-based network, will be easily interfaceable with the single software-implemented instance 83.

Moreover, it is clear that numerous modifications and variants can be made to the present invention, all falling within the scope of the invention, as defined in the appended claims.

In particular, it may be appreciated that the SBAS receiver, according to the present invention, may provide several remote GPS receivers with the respective SBAS-based augmented position through, for instance, a packet-based network. In this case, because the instant at which a GPS receiver asks the respective correction module for an augmented position may be not the same instant at which the respective correction module receives this request because of delays due to the transmission through the packet-based network, the common FSM may store a partial or complete chronology of its states and associated state variables in association with reference time-stamps. Therefore, when a correction module receives a request for SBAS-based augmented position, it retrieves from the storing means the state of the FSM along with the associated state variables which have the most appropriate reference time-stamp for the instant at which the GPS receiver has asked for the SBAS-based augmented position.

Finally, it may be further appreciated that the processing tasks of the correction module may be implemented by an improved GPS receiver remotely connected to the common FSM through, for instance, a packet-based network.

The invention claimed is:

1. A SBAS receiver configured to receive SBAS messages containing augmentation data and to provide one or more served GPS receivers with augmentation information based on the augmentation data extracted from the received SBAS messages; characterized in that the SBAS receiver is designed to implement a Finite State Machine intended to be common to all served GPS receivers, and configured to evolve based on the received SBAS messages and to store the augmentation data contained therein; the common Finite State Machine being further configured to cooperate with a number of correction modules equal to the number of served GPS receivers, each correction module being configured to receive GPS data from a corresponding served GPS receiver, and to compute an augmented position for the corresponding served GPS receiver based on the corresponding GPS data and on augmentation data retrieved from the common Finite State Machine.

2. The SBAS receiver of claim 1, wherein the correction modules are implemented in the SBAS receiver, and the augmentation information provided by the SBAS receiver to each served GPS receiver is the augmented position computed by the corresponding correction module.

3. The SBAS receiver of claim 1, wherein the correction modules are each implemented in a corresponding served GPS receiver, and the augmentation information provided by the SBAS receiver to the served GPS receiver is the augmentation data stored in the common Finite State Machine.

4. The SBAS receiver of claim 1, wherein the common Finite State Machine comprises a number of dedicated Finite State Machines, each associated with a corresponding type of SBAS message that may be received by the SBAS receiver, and each configured to evolve based on the received corresponding SBAS messages and to store the augmentation data contained therein.

5. The SBAS receiver of claim 4, wherein each dedicated Finite State Machine is configured to provide information on availability or unavailability of corresponding augmentation data, and to store corresponding augmentation data when available.

6. The SBAS receiver of claim 5, wherein a dedicated Finite State Machine associated with a specific type of SBAS message is further configured to store different sets of augmentation data associated with different application conditions during the computation of the augmented position for a served GPS receiver.

7. The SBAS receiver of claim 6, wherein a correction module is configured to apply, during the computation of the augmented position for a served GPS receiver, the set of augmentation data whose application condition is met.

8. The SBAS receiver of claim 7, wherein an application condition includes a time of application of the corresponding set of augmentation data during the computation of the augmented position.

9. The SBAS receiver according to claim 1, further including an antenna to receive the SBAS messages.

10. The SBAS receiver according to claim 1, further including a first packet-based network input interface to receive the SBAS messages.

11. The SBAS receiver according to claim 1, wherein the common Finite State Machine and the correction modules are software-implemented.

12. The SBAS receiver according to claim 1, further including a second packet-based network input interface to receive the GPS data from the served GPS receivers.

13. The SBAS receiver according to claim 1, wherein it is integrated with a GPS receiver.

* * * * *

UNITED STATES PATENT AND TRADEMARK OFFICE
CERTIFICATE OF CORRECTION

PATENT NO. : 8,599,065 B2  Page 1 of 1
APPLICATION NO. : 12/933288
DATED : December 3, 2013
INVENTOR(S) : Rodriguez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 244 days.

Signed and Sealed this
Twenty-second Day of September, 2015

Michelle K. Lee
*Director of the United States Patent and Trademark Office*